Patented Nov. 25, 1952

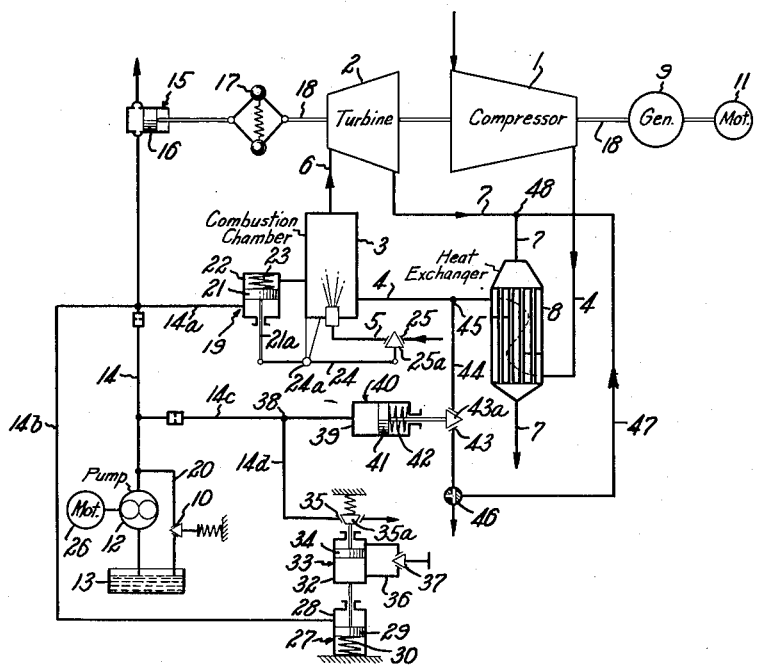

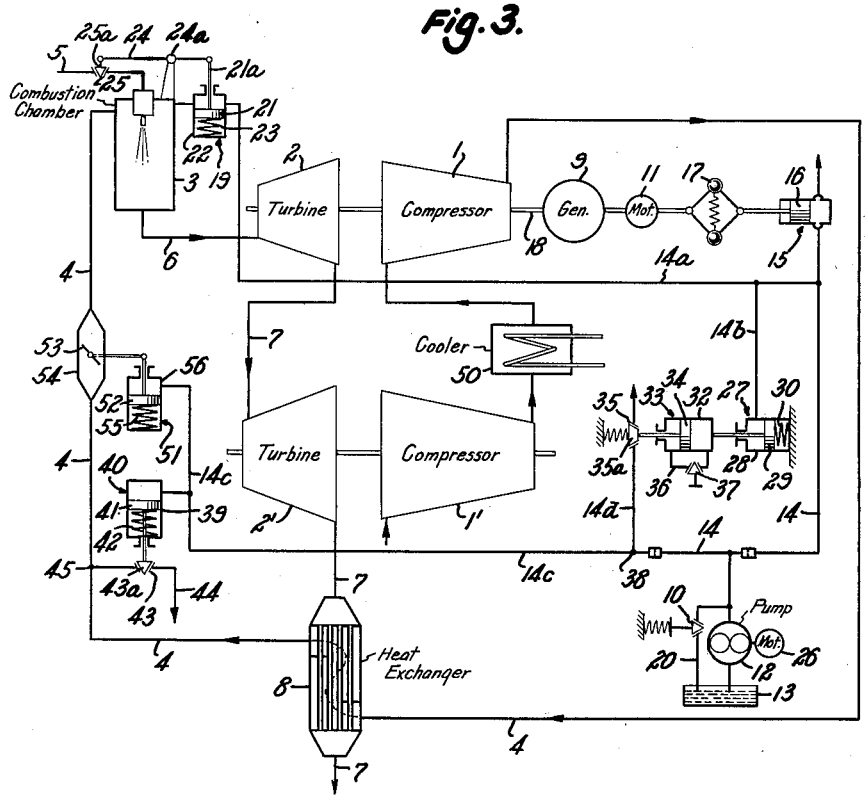

2,618,926

UNITED STATES PATENT OFFICE 2,618,926

GAS TURBINE POWER PLANT HAVING MEANS TO REDUCE AIR SUPPLY IN RESPONSE TO SUDDEN LOAD DECREASE

Hans Pfenninger, Baden, Switzerland, assignor to Aktiengesellschaft Brown, Boveri & Cie, Baden, Switzerland, a joint stock company Application February 28, 1949, Serial No. 78,791
In Switzerland March 2, 1948

4 Claims. (Cl. 60—39.09)

This invention relates to power plants of the combustion gas turbine type in which the principal operating components are constituted by a compressor, a combustion chamber receiving air from the compressor and adding energy thereto by the combustion of fuel, and a turbine driven by the hot combustion gases from the combustion chamber, the turbine and compressor components being mounted on the same shaft from which power is supplied to the load which is usually in the form of an electrical generator.

To maintain a good thermal efficiency in the plant, it is quite common to place a heat exchanger in the exhaust line of the turbine to recover the substantial quantity of heat that these gases contain and which otherwise would be wasted. The heat recovered from the exchanger can be reintroduced into the system in several ways, but the most common use made of it is in preheating the air intermediate the compressor outlet and the combustion chamber inlet. These heat exchangers run to rather large heat storage capacities and hence are capable of furnishing a substantial amount of heat to the system. So long as the plant load is maintained at a rather high level, full use of the heat stored in the exchanger can be made. However, in the event that the plant load is suddenly decreased either partially or completely, it has been found most difficult to keep the speed of the plant from increasing solely by reducing the rate of fuel flow to the combustion chamber. This is of course due to the fact that while input energy from the fuel is cut off, the heat stored in the heat exchanger continues to give off energy at a rather high rate.

The object of the present invention is to prevent the power plant from racing in the event of sudden load removal and is attained with improved apparatus for automatically blowing off air from the line between the air outlet of the heat exchanger and the air inlet to the combustion chamber. The air blow-off may also be accompanied by throttling of the air leading to the combustion chamber.

While apparatus may be employed in various ways depending upon the type of governor control used to regulate speed of the output shaft, the invention is described herein as applied to a power plant equipped with the commonly used oil pressure type of governor.

In the accompanying drawings,

Fig. 1 is a somewhat schematic diagram of a combustion gas turbine plant incorporating the invention;

Fig. 2 is a plot of curves showing variation in plant speed and oil pressure for different types of load variation; and Fig. 3 is a view similar to Fig. 1 but illustrating an application of the inventive principles to a plan incorporating multi-stage compressor and turbine components.

Referring now to Fig. 1, the power plant is seen to be of the open circuit type and comprised of a compressor 1 receiving air from atmosphere to be compressed, the compressor being driven by a turbine 2, and a combustion chamber 3 receiving compressed air from the compressor via conduit 4. Fuel is admitted to chamber 3 from a supply line 5 for combustion with the compressed air, and the combustion products along with an excess of air for cooling is introduced to the turbine 2 via conduit 6. Waste gases from the turbine are conveyed away in conduit 7 and also pass through exchanger 8 prior to discharge to atmosphere, for preheating the compressed air on its way from the compressor to the combustion chamber. And the power generated by turbine 2 in excess of that required for driving compressor 1 is used to drive an electrical generator 9 or some other type of useful load. An electric motor 11 can be employed for starting the plant.

The governor system for maintaining the speed of the plant substantially constant with variation in load and which is of the oil pressure type includes a positive displacement pump 12 that takes oil from a sump 13 and delivers it at increased pressure to the line 14. Included in the latter is a valve 15 through which the oil flows back to the sump and a valve piston 16 connected to a ball governor 17 running off the output shaft 18 of the turbine-compressor-generator group.

Associated with the oil line 14 is an oil pressure responsive control for the fuel supplied to the combustion chamber 3 and which includes a hydraulic motor 19 containing a piston 21 that is moved in cylinder 22 by the pressure of the oil in branch line 14a against a loading spring 23. Piston rod 21a is pivotally connected to one end of a lever 24 fulcrumed at 24a intermediate its ends, and to the other end of the lever 24 is connected the control member 25a of valve 25 located in the fuel line 5. Operation is as follows:

Should the load on generator 9 decrease, the fly balls on governor 17 will move outward thus moving valve piston 16 more to the right and allowing a higher rate of oil flow through valve 15 which is reflected by a corresponding drop in pressure in lines 14 and 14a since pump 12 is driven at constant speed by motor 26 and the pressure maintaining valve 10 in the by-pass 20 around the pump from line 14 to the sump 13 remains inoperative during normal variations in oil pressure. The drop in oil pressure decreases the lifting force applied by the oil pressure to the underside of piston 21 and hence the latter will move downward causing upward movement of valve 25a to a more closed position and a corresponding reduction in the rate of fuel supply to the combustion chamber to compensate for the reduction in load on generator 9. An increase in generator load results in a pressure rise in oil lines 14, 14a which in turn causes the fuel valve 25 to open wider.

While the governor system described above will maintain good speed regulation for gradual changes in load it was found that when large air preheaters 8 were used and the load removed suddenly, fuel cut-off through valve 25 was insufficient to maintain constant speed at the output shaft 18 which is essential to maintainance of constant frequency of the voltage produced by the alternating current generator 9. The difficulty was of course attributable to the large amount of heat stored in the air preheater 8 which continued to supply energy to the air on its way to the turbine 2 despite the fact that the fuel was cut off.

To overcome this operating disadvantage is the objective of this invention, and as previously stated, is effected by apparatus which blows off compressed air at the outlet side of the preheater 8. The control is so arranged that blow-off occurs only when there is a sudden decrease in the plant load, that is when the rate of change of the decrease exceeds a predetermined maximum as will become more apparent from the detailed control now to be described; it is inoperative in cases where the load is removed gradually.

The blow-off control includes a hydraulic motor 27 comprised of a stationary cylinder 28 and piston 29 loaded upwardly by spring 30. Oil from the high pressure line 14 over branch line 14b is admitted to cylinder 28 above piston 29. Piston 29 is connected to the cylinder 32 of a dash pot 33 and the dash pot piston 34 is connected to the valve member 35a of valve 35 controlling the return of oil through branch line 14d to sump 13. A by-pass 36 between the ends of cylinder 32 containing a manually adjustable valve 37 for regulating the rate of flow of fluid from one side to the other of piston 34 can be used for adjusting the dash pot action. Oil line 14d is tapped to branch line 14c at T connection 38 placed intermediate the main high pressure oil line 14 and the cylinder 39 of still another hydraulic motor 40. The piston 41 of the latter, which is also loaded by a spring 42 against the force exerted by the oil pressure, is connected to the valve member 43a of valve 43 placed in an air blow-off conduit 44 that is tapped to the compressed air conduit 4 at a T connection 45 located intermediate the air preheater 8 and combustion chamber 3.

Operation of the air blow-off control is as follows: Should the load on generator 9 drop off rapidly, the correspondingly effected sudden drop in oil pressure in line 14 and the branch line 14b as valve 15 suddenly opens due to the sudden rise in speed of shaft 18 results in a sudden displacement of piston 29 in motor 27 under the force of loading spring 30 causing the cylinder and piston elements of dash pot 33 to move upward substantially as a unit with piston 29 as there is no time for the temporary differential oil pressure then in effect on opposite ends of the dash pot piston 24 to equalize itself by flow through the by-pass 36. Hence valve 35 is opened thus dropping the oil pressure in branch line 14c still further due to the oil flow through line 14d, and the force exerted on piston 41 by loading spring 42 will now be sufficient to open valve 43 thus blowing off to atmosphere the compressed air from conduit 4 until the temporary over speed condition of the output shaft 18 has been corrected to agree with the new loading at which time the oil pressure in line 14 and its branches 14a and 14b will have regained a new level corresponding to the new loading. The pressure rise in branch 14b causes downward movement of piston 29 and dash pot 33 thus closing valve 35 to stop oil flow through line 14d and restoring the oil pressure in branch 14c to the new level which is then effective to move piston 41 against the action of loading spring 42 and close the blow-off valve 43.

The curves plotted in Fig. 2 show typical response characteristics of a combustion gas turbine plant both with and without the use of the air blow-off control which has been described. Curves $a$, $a'$, $a''$, and $a'''$ are speed curves (speed of shaft 18) plotted against time and curves $b$, $b'$, $b''$ and $b'''$ are the corresponding oil pressure conditions in oil line 14. With the plant operating at full load, it will be observed from the full load curve $a$ that the speed of shaft 18 remains constant with time. At zero load, the speed of shaft 18 may be higher than at full load but also remains constant with time as seen from the zero load curve $a''$, the difference between the zero and full load speeds being dependent upon the degree of irregularity of the governor. Curves $b$ and $b''$ designate the corresponding oil pressure levels in line 14 for full and zero load conditions and it will be observed that these also remain constant.

If the plant is not equipped with the air blow-off control according to the present invention, a sudden and substantial drop in load from the full load condition will cause the speed of shaft 18 to vary radically in accordance with curve $a'''$. Tracing the course of curve $a'''$ from left to right, it will be seen that as soon as the load drops, the speed of shaft 18 rises rapidly to and even exceeds the zero load curve $a''$. Assuring the emergency trip governor (not illustrated) is not actuated, the speed subsequently begins to decrease, falling below the zero load curve $a''$, and after a temporary dip below the full load curve $a$, finally stabilizes at a new speed slightly above the latter corresponding to the reduction in load. The corresponding changes in oil pressure during the readjustment period are shown by curve $b''$, $b'''$.

If, however, the plant is equipped with the blow-off control of the present invention, a drop in load of similar degree and suddenness will also be accompanied by a temporary increase in the speed of shaft 18, but as shown by curve $a'$ the change in speed due to the air blow-off action is far less than that experienced when air blow-off is not used, and also speed stabilization at the new load value occurs far more quickly. The corresponding changes in oil pressure during the adjustment period are shown by curve $b'$.

On the other hand, should the relief of load from generator 9 take place gradually, the oil pressure in line 14b and at the upper side of piston 29 will likewise sink so gradually that the fluid in dash pot cylinder 32 will have time to redistribute itself from one side of piston 34 to the other as the dash pot cylinder 32 moves gradually upward. Hence, valve 35 will remain closed and the oil pressure in line 14c will remain sufficiently high to maintain the air blow-off valve 43 closed. Under these conditions, readjustment of the speed of shaft 18 to the new load level will then likewise be along a curve similar to curve a'.

Instead of blowing off the hot compressed air through conduit 44 to atmosphere, a two-way valve 46 can be installed in the conduit 44 to alternatively return the hot air via conduit 47 to the exhaust conduit 7 from turbine 2 at T connection 48 ahead of the heat exchanger 8. This serves to increase the turbine back pressure and hence increases the throttling effect on the turbine as the head of the latter is further reduced by such action.

The principles of the invention are equally as applicable to a turbine plant using a plurality of turbine and compressor components cascaded together. Fig. 3 shows such an arrangement with compressor 1 and turbine 2 driving the output shaft 18 and comprising the high pressure stage of the plant, and compressor 1' and turbine 2' the low pressure stage. The air taken in from atmosphere is initially compressed in compressor 1' and is thereafter passed through an interstage cooler 50 prior to its admission to the high pressure compressor stage 1. The hot combustion gases are initially expanded in the high pressure turbine stage 2 and thereafter admitted to the low pressure turbine stage 2' for further expansion. The heat exchanger 8 is located in the exhaust gas conduit from the low pressure turbine 2'.

The system shown in Fig. 3 operates in substantially the same manner as the single stage arrangement shown in Fig. 2, the only difference between them being that the Fig. 3 system also includes an additional hydraulic motor 51 connected in parallel with motor 40 for the purpose of throttling the air intake to combustion chamber 3 in addition to blowing off the air through conduit 44 in the event of a sudden decrease in load. The additional throttling action of the air is usually advisable in cases where the heat storage capacity of the heat exchanger 8 is too large to obtain satisfactory results by the air blow-off action alone.

Motor 51 includes a piston 52 linked to the vane 53 in throttle valve 54 placed in the air conduit 4, the piston being loaded by spring 55 in such direction as to move the vane towards a more closed position. The piston is, however, urged in the opposite direction by the pressure of oil admitted to the motor cylinder 56 from branch line 14c. Thus the same drop in oil pressure in line 14c relied upon to open the air blow-off valve 43 will also work to permit the throttle vane 53 to move towards a more closed position under the force of the loading spring 55.

In conclusion, it will now be apparent that by means of my improved apparatus for governing the speed of combustion gas turbine plants, any tendency of the power output shaft to race under conditions where the load is suddenly relieved will be greatly diminished. Furthermore, it will also be understood that while the illustrated apparatus for performing the method is preferred for systems utilizing a governor of the oil pressure type, modifications in the control to adapt the same to other types of governors may be made by those skilled in the art without departing from the spirit and scope of the invention as defined in the appended claims.

I claim:

1. A combustion gas turbine plant of the open circuit type including a compressor having its intake connected to atmosphere, a turbine driving said compressor, a combustion chamber connected between the compressor outlet and the turbine inlet, a heat exchanger in the exhaust gas outlet to atmosphere from said turbine arranged to preheat the compressed air between the compressor outlet and the air inlet to said combustion chamber, blow-off and throttle valves in the compressed air line extending between said air compressor and air inlet to said combustion chamber and operable respectively to divert a portion of the compressed air from said air inlet and throttle the remainder, and means responsive to the rate at which the plant load decreases for controlling said valves, said rate responsive control means being effective to open said blow-off valve and move said throttle valve to a more closed position only when the rate of decrease in plant load exceeds a predetermined maximum, said valves otherwise remaining unaffected.

2. A combustion gas turbine plant of the open circuit type including a compressor, having its intake connected to atmosphere, a turbine driving said compressor, a combustion chamber connected between the compressor outlet and the turbine inlet, a heat exchanger in the exhaust gas outlet to atmosphere from said turbine arranged to preheat the compressed air between the compressor outlet and the air inlet to said combustion chamber, a blow-off line tapped to the compressed air line between said heat exchanger and the air inlet to said combustion chamber and which extends to the gas exhaust outlet from said turbine in advance of said heat exchanger, a valve controlling air flow through said blow-off line, and means responsive to the rate at which the plant load decreases for controlling said valve, said rate responsive control means being effective and opening said valve only when the rate of decrease in plant load exceeds a predetermined maximum, said valve being otherwise maintained closed.

3. A combustion gas turbine plant of the open circuit type including a compressor having its inlet connected to atmosphere, a turbine driving said compressor, a combustion chamber connected between the compressor outlet and the turbine inlet, a heat exchanger in the exhaust gas outlet to atmosphere from said turbine arranged to preheat the compressed air between the compressor outlet and the air inlet to said combustion chamber, a governor system for said plant, said system being of the fluid pressure type and including means establishing a control pressure inversely proportional to the turbine speed, a blow-off valve in the compressed air line on the outlet side of said heat exchanger, and means responsive to the rate at which the oil pressure increases with a decrease in plant load for controlling said valve, said rate responsive control means being effective and opening said valve only when the rate of increase in oil pressure exceeds a predetermined maximum, said valve being otherwise maintained closed.

4. A combustion gas turbine plant of the open circuit type including a compressor having its intake connected to atmosphere, a turbine driving said compressor, a combustion chamber connected between the compressor outlet and the turbine inlet, a heat exchanger in the exhaust gas outlet to atmosphere from said turbine arranged to preheat the compressed air between the compressor outlet and the air inlet to said combustion chamber, a governor system for said plant, said system being of the fluid pressure type and including means establishing a control pressure inversely proportional to turbine speed, a blow-off valve in the compressed air line on the outlet side of said heat exchanger, a first motor responsive to said control pressure for actuating said blow-off valve, said valve being normally closed but automatically opened upon a predetermined drop in said control pressure in a branch line supplying said motor, a bleed line connected to said branch line for dropping the control pressure in the latter to a level where said blow-off valve will open, a normally closed valve in said bleed line, a second motor responsive to said control pressure and actuated at a displacement rate proportional to the rate of change of said pressure, and linkage means including a dash pot coupling connecting said second motor with said bleed line valve to thereby effect opening of the latter only upon a sudden increase in turbine speed and which is reflected by a sudden decrease in said control pressure.

HANS PFENNINGER.

REFERENCES CITED

The following references are of record in the file of this patent:

UNITED STATES PATENTS

| Number | Name | Date |
|---|---|---|
| 2,459,709 | Lysholm | Jan. 18, 1949 |
| 2,472,924 | Schwendner | June 14, 1949 |
| 2,495,604 | Salzmann | Jan. 24, 1950 |

FOREIGN PATENTS

| Number | Country | Date |
|---|---|---|
| 601,964 | France | Dec. 16, 1925 |